United States Patent
Kim et al.

(10) Patent No.: US 10,032,062 B2
(45) Date of Patent: Jul. 24, 2018

(54) METHOD AND APPARATUS FOR RECOGNIZING FINGERPRINT

(71) Applicant: Samsung Electronics Co., Ltd., Suwon-si, Gyeonggi-do (KR)

(72) Inventors: Wonjun Kim, Hwaseong-si (KR); Sungjoo Suh, Seoul (KR); Kyuhong Kim, Seoul (KR); Namjoon Kim, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 29 days.

(21) Appl. No.: 15/088,545

(22) Filed: Apr. 1, 2016

(65) Prior Publication Data
US 2016/0307023 A1  Oct. 20, 2016

(30) Foreign Application Priority Data

Apr. 15, 2015  (KR) ......................... 10-2015-0053315
Oct. 1, 2015   (KR) ......................... 10-2015-0138515

(51) Int. Cl.
*G06K 9/00* (2006.01)
*G06F 17/30* (2006.01)
(Continued)

(52) U.S. Cl.
CPC ..... *G06K 9/00087* (2013.01); *G06F 17/3053* (2013.01); *G06F 17/30256* (2013.01); *G06F 21/32* (2013.01); *G06K 9/00013* (2013.01); *G06K 9/00026* (2013.01); *G06K 9/00067* (2013.01); *G06K 9/03* (2013.01); *G06K 9/4642* (2013.01); *G06K 9/6203* (2013.01)

(58) Field of Classification Search
CPC .......... G06K 9/00087; G06K 9/00013; G06K 9/00067; G06K 9/4642; G06K 9/6203; G06F 17/30256; G06F 17/3053; G06F 21/32
USPC ....................................................... 382/124
See application file for complete search history.

(56) References Cited

U.S. PATENT DOCUMENTS 7,142,699 B2 * 11/2006 Reisman ............ G06K 9/00087
                                                    382/124
7,616,787 B2    11/2009 Boshra
(Continued)

FOREIGN PATENT DOCUMENTS

JP   2003288160 A   10/2003
JP   4188342 B2     11/2008
(Continued)

OTHER PUBLICATIONS

Extended European Search Report for Corresponding European Patent Application No. 16165366.2 dated Oct. 20, 2016.

*Primary Examiner* — Iman K Kholdebarin
(74) *Attorney, Agent, or Firm* — Harness, Dickey & Pierce, P.L.C.

(57) ABSTRACT

A fingerprint recognition method includes receiving an input partial image corresponding to a partial image of a fingerprint of a first user; partitioning the input partial image into a plurality of blocks; performing a comparison operation based on the plurality of blocks and the enrolled partial images corresponding to partial images of an enrolled fingerprint; and recognizing the fingerprint of the first user based on a result of the comparison operation.

36 Claims, 12 Drawing Sheets

(51) Int. Cl.
    *G06F 21/32*     (2013.01)
    *G06K 9/03*     (2006.01)
    *G06K 9/46*     (2006.01)
    *G06K 9/62*     (2006.01)

(56) References Cited

U.S. PATENT DOCUMENTS

| | | | |
|---|---|---|---|
| 9,268,991 B2* | 2/2016 | Russo | G06K 9/00087 |
| 9,367,728 B2* | 6/2016 | Chiang | G06K 9/00073 |
| 2008/0226132 A1 | 9/2008 | Gardner | |
| 2014/0003677 A1* | 1/2014 | Han | G06K 9/00006 |
| | | | 382/124 |
| 2014/0003680 A1 | 1/2014 | Marciniak et al. | |
| 2014/0270420 A1* | 9/2014 | Boshra | G06K 9/0008 |
| | | | 382/125 |
| 2014/0355845 A1* | 12/2014 | Benkley | G06F 3/03547 |
| | | | 382/124 |
| 2016/0307023 A1* | 10/2016 | Kim | G06K 9/00087 |
| 2017/0004346 A1* | 1/2017 | Kim | G06F 17/30268 |

FOREIGN PATENT DOCUMENTS

| | | |
|---|---|---|
| KR | 20100032152 A | 3/2010 |
| KR | 101012596 B1 | 2/2011 |
| KR | 101419784 B1 | 7/2014 |

* cited by examiner

METHOD AND APPARATUS FOR RECOGNIZING FINGERPRINT

CROSS-REFERENCE TO RELATED APPLICATION

This application claims under 35 U.S.C. § 119 to Korean Patent Application No. 10-2015-0053315, filed on Apr. 15, 2015 and Korean Patent Application No. 10-2015-0138515, filed on Oct. 1, 2015, in the Korean Intellectual Property Office, the entire contents of which are incorporated herein by reference in its entirety.

BACKGROUND

1. Field

At least one example embodiment relates to a method and an apparatus for recognizing a fingerprint.

2. Description of the Related Art

Biometrics-based authentication technology relates to user authentication using a fingerprint, an iris, a voice, a face, blood vessels, and the like which are individually unique to a user. Such biological characteristics used for the authentication differ from individual to individual, rarely change during a lifetime, and have a low risk of being stolen or copied. In addition, individuals do not need to intentionally carry such characteristics, and thus may not experience an inconvenience using the biological characteristics. In such an authentication technology, a fingerprint recognition method is very commonly used for various reasons, for example, a high level of convenience, security, and economic efficiency. The fingerprint recognition method may reinforce security of a user device and readily provide various application services such as mobile payment.

SUMMARY

Some example embodiments relate to a fingerprint recognition method.

In some example embodiments, the method may include receiving an input partial image corresponding to a partial image of a fingerprint of a user, partitioning the input partial image into blocks, comparing the blocks to enrolled partial images corresponding to partial images of an enrolled fingerprint, and recognizing the fingerprint of the user based on a result of the comparing.

The receiving may include sensing a partial region of the fingerprint of the user through a sensing region smaller than a size of the fingerprint of the user. The enrolled partial images may be generated by iteratively sensing partial regions of a fingerprint of an enrolled user through a sensing region smaller than a size of the fingerprint of the enrolled user.

The comparing may include calculating scores indicating a degree of matching between each of the blocks and the enrolled partial images.

The comparing may include matching the blocks to the enrolled partial images, and comparing the blocks to the enrolled partial images based on a result of the matching. The matching may include determining at least one of translation information, rotation information, and scale information between the blocks and the enrolled partial images based on a frequency-based matching method.

The comparing may include determining optimal rotation angles with respect to the enrolled partial images by matching each of the blocks to the enrolled partial images, rotating the blocks in response to the enrolled partial images based on the optimal rotation angles with respect to the enrolled partial images, and comparing the blocks rotated in response to the enrolled partial images to the enrolled partial images.

The determining of the optimal rotation angles may include determining rotation angles between the blocks and the enrolled partial images based on the frequency-based matching method, and determining the optimal rotation angles with respect to the enrolled partial images using scores based on the rotation angles.

The comparing may include calculating scores by matching each of the blocks to the enrolled partial images, selecting a predetermined number of enrolled partial images from among the enrolled partial images based on the calculated scores, determining optimal rotation angles with respect to the selected enrolled partial images based on the calculated scores, rotating the blocks in response to the selected enrolled partial images based on the optimal rotation angles with respect to the selected enrolled partial images, and comparing the blocks rotated in response to the selected enrolled partial images to the selected enrolled partial images. The predetermined number may be less than a number of the enrolled partial images.

The recognizing may include at least one of authenticating the user based on the result of the comparing and identifying the user based on the result of the comparing.

The recognizing may include selecting a predetermined number of pairs of the blocks and the enrolled partial images based on the result of the comparing, and recognizing the fingerprint of the user based on the selected pairs.

The selecting may include selecting the number of pairs based on a score between a block and an enrolled partial image included in each of the pairs.

Other example embodiments relate to a fingerprint recognition apparatus.

In some example embodiments, the apparatus may include a fingerprint sensor configured to receive an input image corresponding to a fingerprint of a user, and at least one processor configured to partition the input image into blocks, compare the blocks to at least one enrolled image corresponding to an enrolled fingerprint, and recognize the fingerprint of the user based on a result of the comparing.

Other example embodiments relate to a bioimage recognition method.

In some example embodiments, the method may include receiving an input image corresponding to biodata of a user, partitioning the input image into blocks, comparing the blocks to an enrolled image corresponding to enrolled biodata, and recognizing the user based on a result of the comparing.

Additional aspects of example embodiments will be set forth in part in the description which follows and, in part, will be apparent from the description, or may be learned by practice of the disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
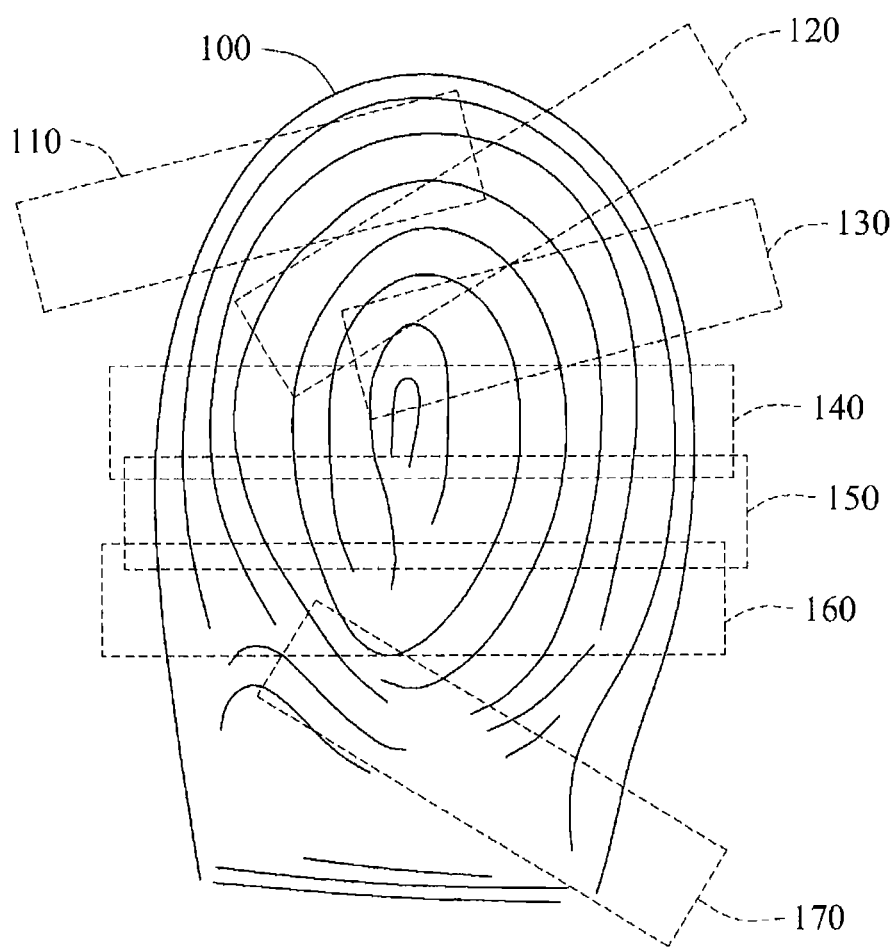
FIGS. 1 and 2 illustrate examples of a fingerprint image according to at least one example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contras when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Example embodiments described herein may be used for recognizing a fingerprint of a user. The recognizing of the fingerprint of the user may include authenticating or identifying the user. The authenticating of the user may include, for example, determining whether the user is an enrolled user. A result of the authenticating may be output as true or false. The identifying of the user may include, for example, determining a user corresponding to the user among a plurality of enrolled users. A result of the identifying may be output as, for example, an identity (ID) of the determined enrolled user. When the user does not correspond to any one of the enrolled users, a signal indicating that the user is not identified may be output.

Example embodiments described herein may be implemented by a product in various forms example of which include, but are not limited to, a personal computer (PC), a laptop computer, a tablet computer, a smartphone, a television (TV), a smart home appliance, an intelligent vehicle, a kiosk, and a wearable device. For example, example embodiments described herein may be applied to authenticate a user in, for example, a smartphone, a mobile device, and a smart home system. In addition, example embodiments described herein may be applied to a payment service provided through user authentication. Further, example embodiments described herein may also be applied to an intelligent automobile system that automatically starts a vehicle through user authentication. Hereinafter, example embodiments will be described in detail with reference to the accompanying drawings.

Figure 2:
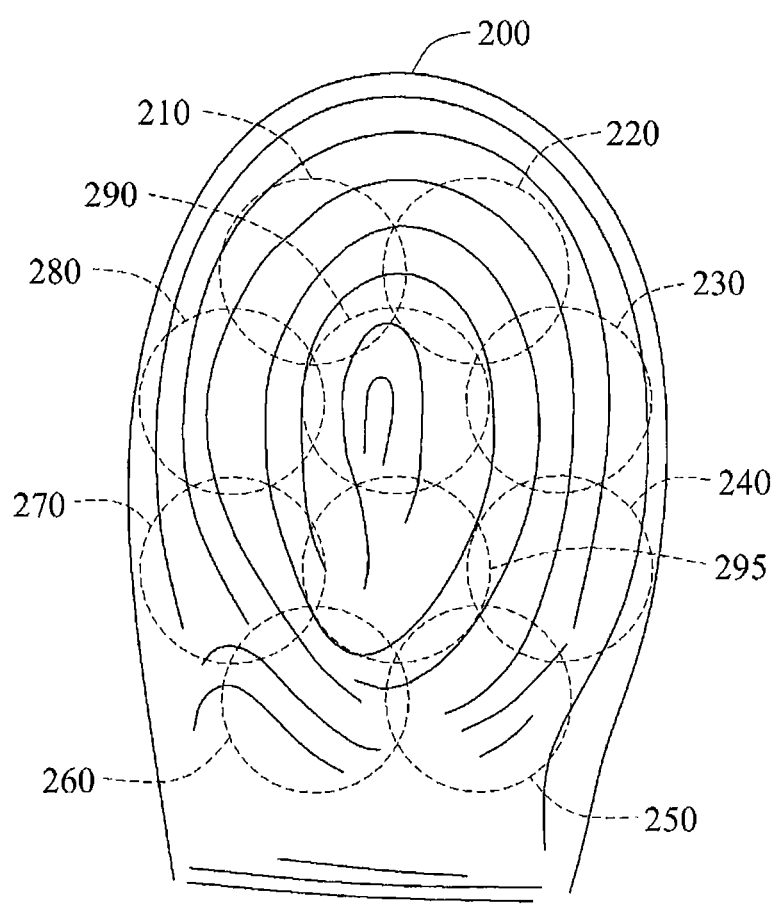

FIGS. 1 and 2 illustrate examples of a fingerprint image according to at least one example embodiment.

Referring to FIG. 1, a fingerprint sensor (not shown) may sense a fingerprint 100 of a user. An example of a fingerprint recognition apparatus including a fingerprint sensor 310 will be discussed in greater detail below with reference to FIGS. 3 and 12. The fingerprint sensor (e.g., the fingerprint sensor 310) may sense the fingerprint 100 through a sensing region. Here, a size of the sensing region of the fingerprint sensor may be smaller than a size of the fingerprint 100. For example, the sensing region of the fingerprint sensor may have a rectangular form smaller than the size of the fingerprint 100. In such an example, the fingerprint sensor may sense a portion of the fingerprint 100 through the sensing region.

The fingerprint sensor may generate a fingerprint image by capturing the sensed portion of the fingerprint 100. When the size of the sensing region of the fingerprint sensor is smaller than the size of the fingerprint 100, the fingerprint image generated by the fingerprint sensor may correspond to a partial image including the portion of the fingerprint 100. Further, according to at least some example embodiments, it is also possible for the sensing region of the fingerprint sensor to be the same size or larger than a size of fingerprint 100, such that the fingerprint image generated by the fingerprint sensor may correspond to a complete image of the fingerprint 100.

The fingerprint image may be used to enroll or recognize the fingerprint 100 of the user. For example, the fingerprint image may be enrolled in an enrollment method. The enrolled fingerprint image may be stored in, for example, memory or prearranged storage. When the size of the sensing region of the fingerprint sensor is smaller than the size of the fingerprint 100, a plurality of fingerprint images corresponding to partial images of the fingerprint 100 of the user may be enrolled. For example, referring to FIG. 1, partial images 110 through 170 may be enrolled. Each of the partial images 110 through 170 may cover a portion of the fingerprint 100, and the partial images 110 through 170 in combination may entirely cover the fingerprint 100. Here, the partial images 110 through 170 may overlap one another. Hereinafter, a partial image of an enrolled fingerprint will be referred to as an enrolled partial image for ease of description.

In addition, an input fingerprint image may be recognized in a recognition method. For example, the recognition method may include performing a comparison of the input fingerprint image and an enrolled fingerprint image. A result of authenticating or identifying a user may be obtained based on whether the input fingerprint image matches the enrolled fingerprint image. Here, when the size of the sensing region of the fingerprint sensor is smaller than the size of the fingerprint 100, the input fingerprint image may correspond to a partial image of the fingerprint 100 of the user. Hereinafter, a partial image of a fingerprint of a user will be referred to as an input partial image for ease of description. Although described hereinafter, example embodiments provide a method of recognizing a fingerprint, which will be referred to as a fingerprint recognition method for simplicity, including comparing an input partial image to enrolled partial images.

Although the sensing region of the fingerprint sensor is illustrated as a rectangular form in FIG. 1, various sizes and forms may be applicable to the sensing region. For example, the sensing region may be provided in a circular form as illustrated in FIG. 2. Referring to FIG. 2, in the enrollment method, a plurality of partial images 210 through 295 corresponding to a single fingerprint 200 may be enrolled. The recognition method may include performing a comparison of a fingerprint image corresponding to a portion of the fingerprint 200 and the enrolled partial images 210 through 295.

According to at least some example embodiments, a fingerprint sensor used in the enrollment method may differ from a fingerprint sensor used in the recognition method. For example, a fingerprint sensor having a rectangular-shaped sensing region as illustrated in FIG. 1 may be used in the enrollment method, and a fingerprint sensor having a circular-shaped sensing region as illustrated in FIG. 2 may be used in the recognition method, or vice-versa. Alternatively, the same fingerprint sensor may be used in both the enrollment method and the recognition method.

Figure 3:
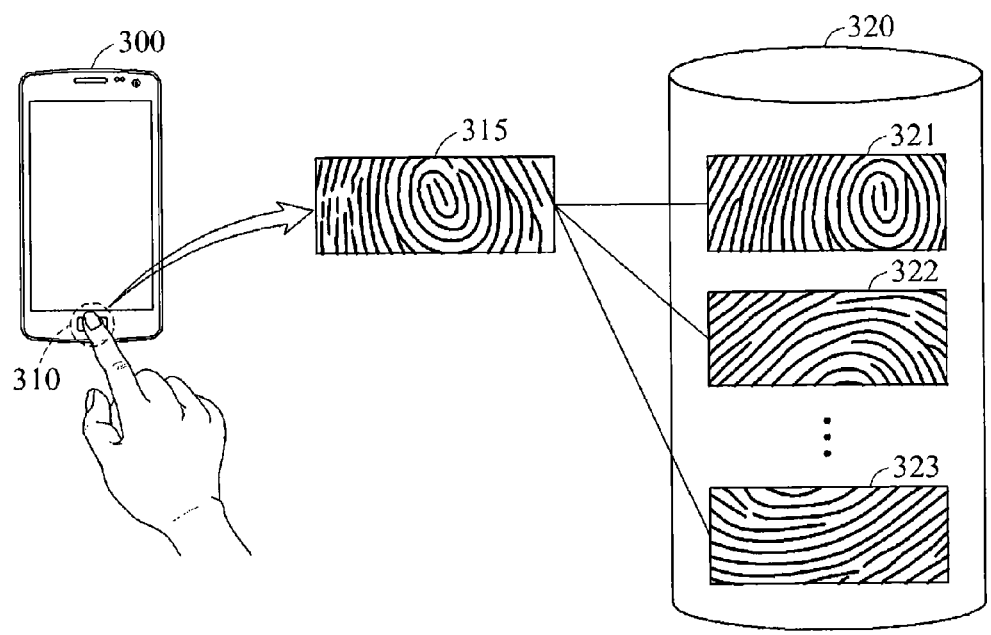
FIGS. 3 and 4 illustrate a fingerprint recognition method according to at least one example embodiment.
Figure 4:
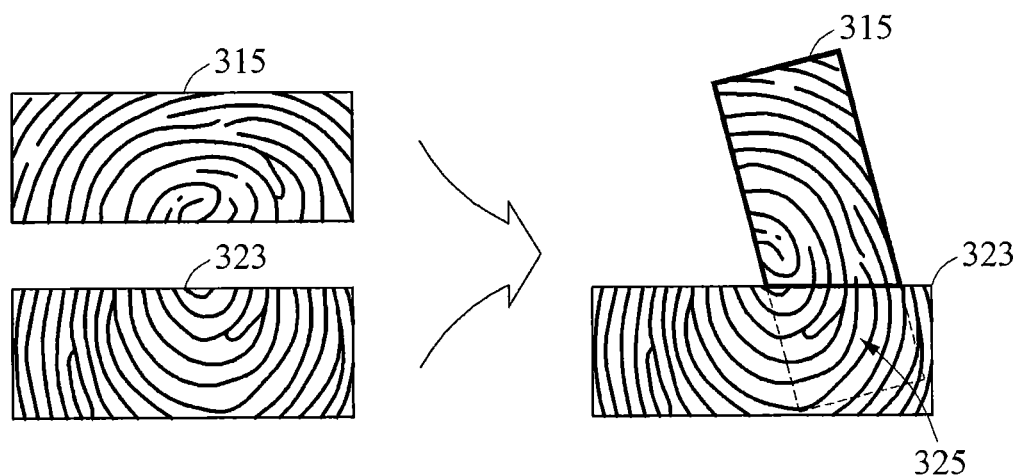

FIGS. 3 and 4 illustrate a fingerprint recognition method according to at least one example embodiment. Referring to FIG. 3, a fingerprint recognition apparatus 300 includes a fingerprint sensor 310. A size of a sensing region of the fingerprint sensor 310 may be smaller than a size of a fingerprint of a user. The fingerprint recognition apparatus 300 may obtain an input partial image 315 through the fingerprint sensor 310. The fingerprint recognition apparatus 300 may obtain enrolled partial images, for example, an enrolled partial image 321, an enrolled partial image 322, and an enrolled partial image 323, from a database 320. According to at least some example embodiments, the database 320 may be a prearranged database. The database 320 may be stored in a memory (not shown) included in the fingerprint recognition apparatus 300, or in an external device (not shown), for example, a server, that may be connected to the fingerprint recognition apparatus 300 in wire or wirelessly, or through a network. According to at least some example embodiments, the size and shape of an input partial image may be the same as the size of enrolled partial images. For example, the input partial image 315 may have the same size and shape as enrolled partial images 321-323 if the input partial images 315 and the enrolled partial images 321-323 are both captured using the fingerprint sensor 310. The fingerprint recognition apparatus 300 may recognize the fingerprint of the user by comparing the input partial image 315 to the enrolled partial images 321 through 323. Referring to FIG. 4, the fingerprint recognition apparatus 300 may match the input partial image 315 to the enrolled partial image 323 to compare the input partial image 315 to the enrolled partial image 323. For example, the fingerprint recognition apparatus 300 may scale, rotate, and/or translate the input partial image 315 to overlap a region of the input partial image 315 and a region of the enrolled partial image 323 which are included in both the input partial image 315 and the enrolled partial image 323. However, each of the input partial image 315 and the enrolled partial image 323 is a partial image and thus, a size of the overlapping region may be considerably smaller than a size of each of the input partial image 315 and the enrolled partial image 323. For example, overlapping region 325 is the region where partial image 315 and partial image 323 overlap. As is illustrated in FIG. 4, the size of overlapping region 325 may be relatively small in comparison to the full size of partial image 315. In such an example, matching the input partial image 315 and the enrolled partial image 323 may be ineffective.

In addition, the input partial image 315 may include a portion deformed by various factors. For example, a fingerprint image may be deformed by a pressure applied to a sensor. When the input partial image 315 is generated, a pressure may be differently applied to each portion of a sensing region of a fingerprint sensor. Thus, at least a portion of the input partial image 315 may be deformed. In addition, the enrolled partial images 321 through 323 may include a portion deformed by various factors. In such a case, comparing the input partial image 315 to the enrolled partial images 321 through 323 may reduce reliability of fingerprint recognition.

Figure 5:
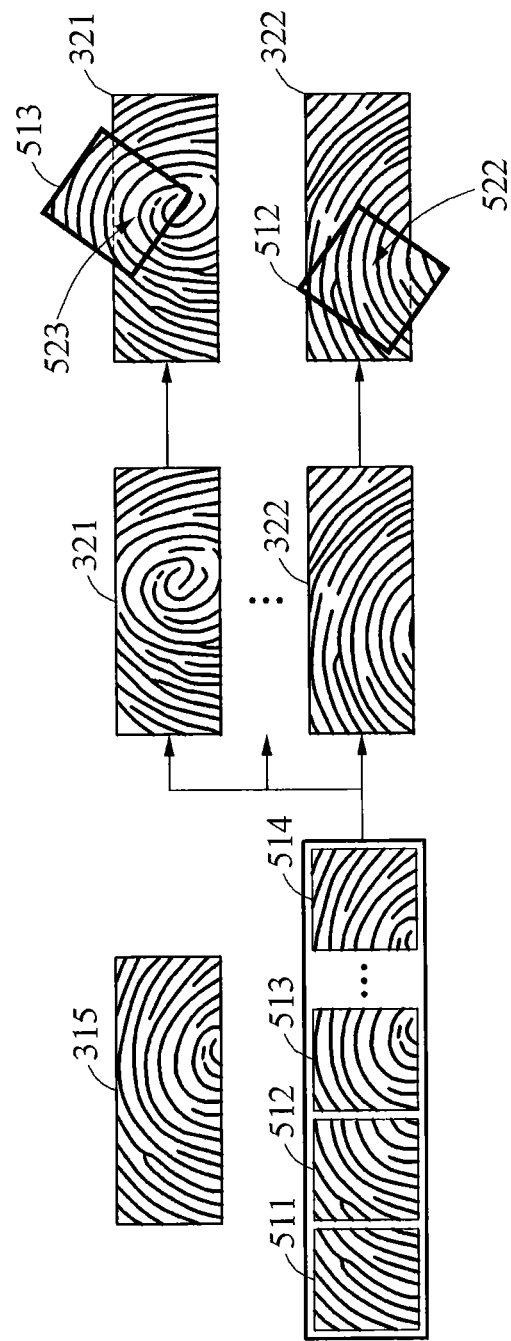
FIG. 5 illustrates a fingerprint recognition method including partitioning an input partial image into blocks and comparing the blocks to enrolled partial images according to at least one example embodiment.

FIG. 5 illustrates a fingerprint recognition method including partitioning an input partial image into blocks and comparing the blocks to enrolled partial images according to at least one example embodiment. Referring to FIG. 5, the fingerprint recognition apparatus 300 of FIG. 3 may partition the input partial image 315 into blocks, for example, a block 511, a block 512, a block 513, and a block 514. The partitioning of the input partial image 315 into the blocks 511 through 514 may also be referred to as block partitioning. The fingerprint recognition apparatus 300 may compare the blocks 511 through 514 to the enrolled partial images 321 through 323 of FIG. 3, rather than compare the input partial image 315 to the enrolled partial images 321 through 323. As FIG. 5 illustrates, the fingerprint recognition apparatus 300 may partition an input partial image into blocks such that each of the blocks is smaller, in area, than the input partial image.

The partitioning (or block partitioning) of an image, as discussed in the present disclosure, may refer to one or both of an operation of forming several different blocks of an image that may overlap each other (as is shown in FIG. 5), and an operation of forming several different non-overlapping blocks of the image that may or may not be adjacent to each other.

The fingerprint recognition apparatus 300 may partition the input partial image 315 using various methods. For example, the fingerprint recognition apparatus 300 may partition the input partial image 315 based on a desired or, alternatively, predetermined pattern. The pattern may be determined in advance based on a shape and a size of a sensing region of a fingerprint sensor, a shape and a size of enrolled partial images, and the like. As necessary, the pattern may change dynamically. In addition, the partitioning may be performed to allow blocks to overlap one another, or portions of the blocks to overlap one another.

The fingerprint recognition apparatus 300 may recognize a fingerprint through block pattern matching. The block pattern matching may include pattern matching of partial fingerprint images. Although described hereinafter, the fingerprint recognition apparatus 300 may partition a fingerprint image input through the fingerprint sensor into a plurality of blocks, perform frequency-based matching, arrange matching scores of the blocks, and determine whether to authenticate a user using a feature value of top K matching scores among the arranged matching scores. The feature value may be a value indicating a feature of the top K matching scores, and include a statistical value, for example, an average. The fingerprint recognition apparatus 300 may recognize the fingerprint irrespective of a direction of a finger when the fingerprint image is sensed.

The fingerprint recognition apparatus 300 may improve efficiency of the matching by using the blocks 511 through 514. As is illustrated in FIG. 5, overlapping region 523 is the region where block 513 and partial image 321 overlap, and overlapping region 522 is the region where block 512 and partial image 322 overlap. When the input partial image 315 is input, an overlapping region between the input partial image 315 and the enrolled partial images 321 through 323 may not be large and thus, performing the matching by partitioning the input partial image 315 into the blocks 511 through 514 may be effective. For example, the fingerprint recognition apparatus 300 may calculate a rotation angle and a translation of each block with respect to the enrolled partial images 321 through 323 based on image frequency information. Here, a proportion of a region included in both the block 513 and the enrolled partial image 321, hereinafter referred to as an overlapping region, to the block 513 may be greater than a proportion of the overlapping region to the input partial image 315. For example, the sizes of overlapping regions 523 and 522 may be relatively large in comparison to the full sizes of partial images 321 and 322, respectively. Accordingly, a ratio of the size of overlapping region 523 to the size of block 513 may be larger than a ratio of the size of overlapping region 325 to the size of partial image 315 in FIG. 4. Similarly, a ratio of the size of overlapping region 522 to the size of block 512 may be larger than a ratio of the size of overlapping region 325 to the size of partial image 315 in FIG. 4. Thus, the matching may be performed more effectively.

In addition, using the blocks 511 through 514, the fingerprint recognition apparatus 300 may operate robustly against a deformation that may be included in the input partial image 315 or the enrolled partial images 321 through 323. For example, the fingerprint recognition apparatus 300 may use only a block that suitably matches to the enrolled partial images 321 through 323 among the blocks 511 through 514. The fingerprint recognition apparatus 300 may exclude a result of a comparison performed using a deformed block, and only use a result of a comparison performed using a non-deformed block. Thus, fingerprint recognition robust against a deformation may be performed.

In an enrollment method, the fingerprint recognition apparatus 300 may store only enrolled partial images, and may not store additional information, for example, information about stitching the enrolled partial images and information about matching the enrolled partial images. Thus, technology having a low operation complexity and effectively using a memory may be provided when enrolling the partial images.

The fingerprint recognition apparatus 300 may match the blocks 511 through 514 to the enrolled partial images 311 through 323 using various methods. For example, the fingerprint recognition apparatus 300 may determine translation information, rotation information, scale information, and various combinations thereof between the blocks 511 through 514 and the enrolled partial images 321 through 323 based on a frequency-based matching method. The frequency-based matching method may be a method of performing matching in a frequency domain.

Translation information between a block and an enrolled partial image may include a parameter Tx indicating a translation in an x axis and a parameter Ty indicating a translation in an y axis. Rotation information between a block and an enrolled partial image may include a rotation parameter R. Scale information between a block and an enrolled partial image may include a scale parameter S. Hereinafter, Tx and Ty will be referred to as a translation, and R will be referred to as a rotation angle. The fingerprint recognition apparatus 300 may calculate a rotation angle, a translation, and a scale parameter by comparing the blocks 511 through 514 to the enrolled partial images 321 through 323 in the frequency domain. A method of calculating a rotation angle, a translation, and a scale parameter in a frequency domain will be described in greater detail below with reference to FIG. 8.

The fingerprint recognition apparatus 300 may translate and rotate a block based on the translation information obtained as a result of the matching. The fingerprint recognition apparatus 300 may scale the block up or down based on the scale information obtained as the result of the matching. The translation information, the rotation information, and the scale information may be relative information between a block and an enrolled partial image and thus, the fingerprint recognition apparatus 300 may translate, rotate, scale up, or scale down the enrolled partial image in lieu of the block.

When a block and an enrolled partial image overlap due to a translation, rotation, and scaling, the fingerprint recognition apparatus 300 may calculate a matching score in the overlapping region. For example, the fingerprint recognition apparatus 300 may calculate the matching score based on normalized correlation based on an image brightness value. As described with reference to FIG. 5, the fingerprint recognition apparatus 300 may accurately perform matching on a rotated input fingerprint image. Thus, when a fingerprint image is input at an angle, the fingerprint recognition apparatus 300 may accurately recognize a fingerprint of the fingerprint image.

Figure 6:
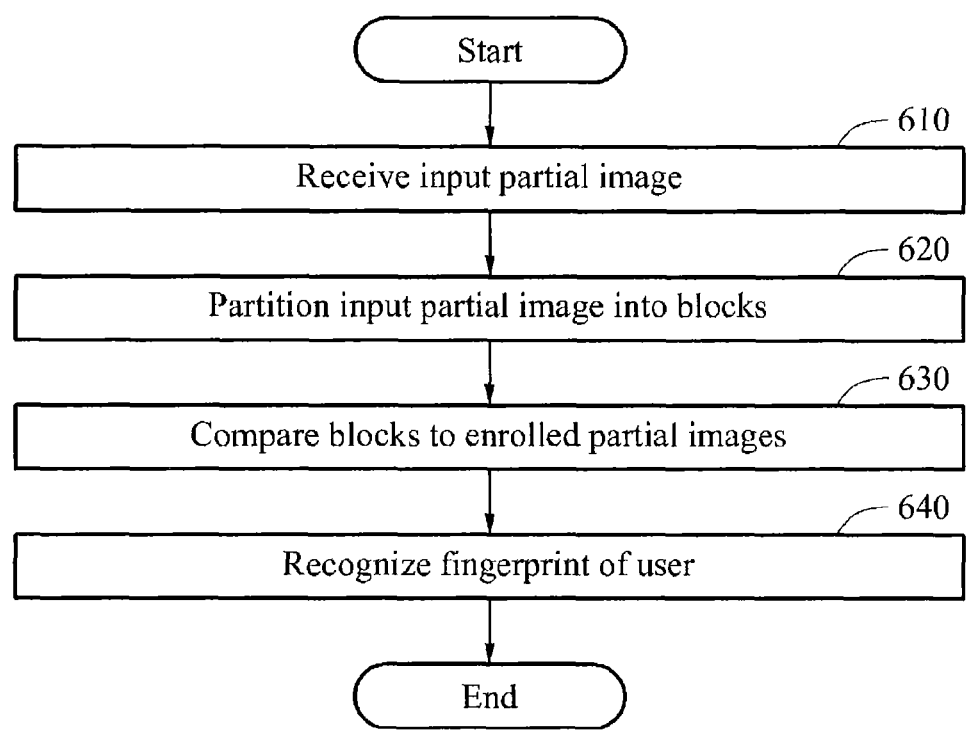
FIG. 6 is a flowchart illustrating an example of a fingerprint recognition method according to at least one example embodiment.

FIG. 6 is a flowchart illustrating an example of a fingerprint recognition method according to at least one example embodiment. Referring to FIG. 6, the fingerprint recognition method includes operation 610 of receiving an input partial image, operation 620 of partitioning the input partial image into blocks, operation 630 of comparing the blocks to enrolled partial images, and operation 640 of recognizing a fingerprint of a user.

Operation 610 of receiving the input partial image may further include performing preprocessing. The preprocessing may include, for example, a series of operations performed to improve a quality of a fingerprint image. The fingerprint image may include the input partial image or the enrolled partial images. For example, the preprocessing may include eliminating noise from the fingerprint image, increasing a contrast of the fingerprint image, deblurring the fingerprint image to remove a blur from the fingerprint image, and warping performed to correct a distortion included in the fingerprint image.

In addition, the preprocessing may include evaluating the quality of the fingerprint image. For example, when the quality of the fingerprint image is less than a threshold quality, the preprocessing may include discarding the obtained fingerprint image and receiving a new fingerprint image. According to at least some example embodiments, the threshold quality may be set in accordance with the preferences of a user and/or manufacturer of the fingerprint authentication device 300.

Descriptions provided with reference to FIGS. 1 through 5 may be applicable to the operations described with reference to FIG. 6. Hereinafter, operations 630 and 640 will be further described in detail with reference to FIGS. 7 and 12.

Figure 7:
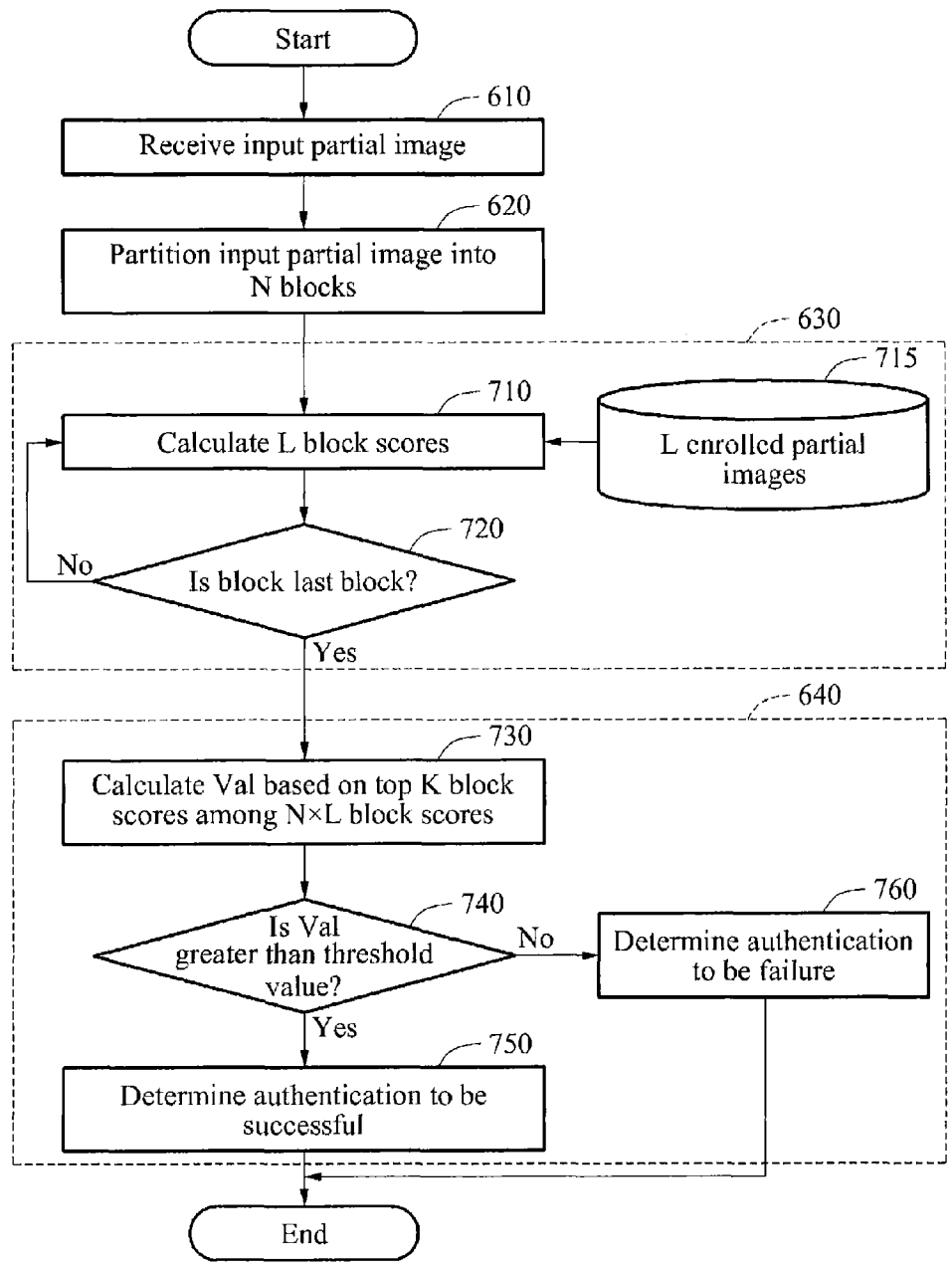
FIG. 7 is a flowchart illustrating an example of a user authentication method according to at least one example embodiment.

FIG. 7 is a flowchart illustrating an example of a user authentication method according to at least one example embodiment. Referring to FIG. 7, in operation 620, a fingerprint recognition apparatus (e.g., the fingerprint recognition apparatus 300) partitions the input partial image into N blocks. Here, N is a positive integer greater than or equal to 2. In operation 710, the fingerprint recognition apparatus obtains L enrolled partial images from a database 715. Here, L is a positive integer greater than or equal to 1. In operation 710, the fingerprint recognition apparatus matches, to the L enrolled partial images, a block currently being processed among the N blocks. In an example, the fingerprint recognition apparatus may match a block to an enrolled partial image using a frequency-based matching method.

Figure 8:
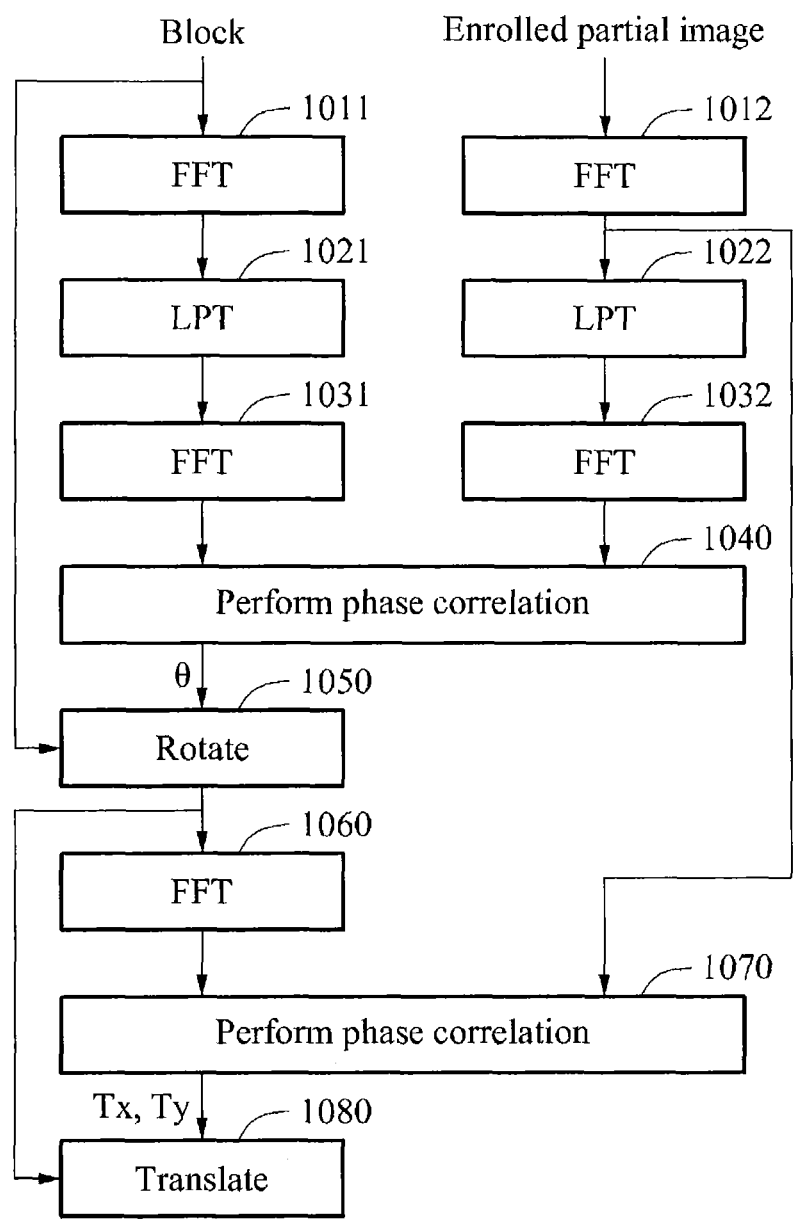
FIG. 8 is a diagram illustrating an example of a frequency-based matching method according to at least one example embodiment.

FIG. 8 is a diagram illustrating an example of a frequency-based matching method according to at least one example embodiment. Referring to FIG. 8, in operation 1011, information in a time domain, hereinafter simply referred to as time-domain information, included in a block is transformed to information in a frequency domain, hereinafter simply referred to as frequency-domain information, through a fast Fourier transform (FFT). In operation 1012, an FFT is applied to an enrolled partial image. Here, the frequency-domain information may be based on an orthogonal coordinates system which expresses information using (x, y) coordinates.

In operation 1021, a coordinates system of frequency-domain information included in the block is transformed to a polar coordinates system through a log-polar transform (LPT). In an example, the LPT may be performed on magnitude values of pixels in an FFT image obtained through the FFT. The polar coordinates system may express information using a radius, an angle, or a combination of a radius and an angle. In operation 1022, the LPT is applied to frequency-domain information included in the enrolled partial image.

Figure 9:
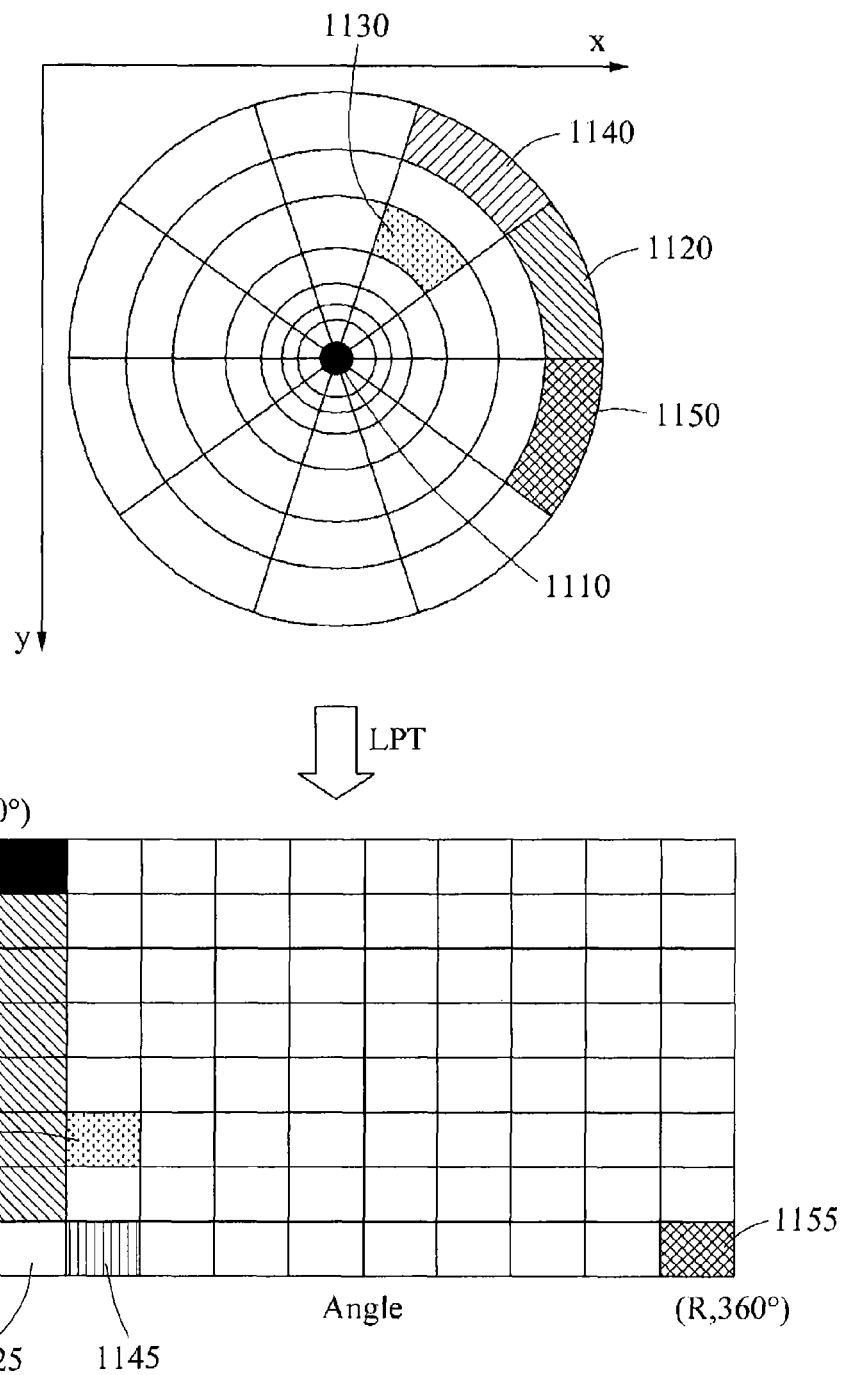
FIG. 9 illustrates an example of a log-polar transformation according to at least one example embodiment.

FIG. 9 illustrates an example of an LPT according to at least one example embodiment. Referring to FIG. 9, in an orthogonal coordinates system, concentric circles are set based on a central point 1110. The concentric circles may be divided into areas based on a radius, an angle, or a combination of a radius and an angle. In an example, the LPT may map the areas in the orthogonal coordinates system to areas in a polar coordinates system of a radius and an angle. In such an example, the central point 1110 in the orthogonal coordinates system ay be mapped to a (0, 0°) area 1115 in the polar coordinates system. In addition, an area 1120, an area 1130, an area 1140, and an area 1150 in the orthogonal coordinates system may be mapped to an area 1125, an area 1135, an area 1145, and an area 1155, respectively.

Although not illustrated, the LPT may map areas in the orthogonal coordinates system to areas in the polar coordinates system of a radius. In such a case, the area 1120 in the orthogonal coordinates system may be mapped to a (0°) area in the polar coordinates system. The area 1130 and the area 1140 in the orthogonal coordinates system may be mapped to a (36°) area in the polar coordinates system. The area 1150 in the orthogonal coordinates system may be mapped to a (324°) area in the polar coordinates system.

Referring back to FIG. 8, in operation 1031, the FFT is applied to an LPT image of the block. In operation 1032, the FFT is applied to an LPT image of the enrolled partial image. In operation 1040, a phase correlation is performed. A peak is detected as a result of the phase correlation, and a location of the detected peak may indicate rotation information, for example, θ between the block and the enrolled partial image.

In another example, the location of the detected peak may indicate scale information between the block and the enrolled partial image. For example, one axis of an LPT image corresponds to an angle, and the other axis corresponds to a radius. In such an example, a location of a peak detected through the phase correlation may be expressed as a coordinate of the axis corresponding to an angle and as a coordinate of the axis corresponding to a radius. The coordinate of the axis corresponding to an angle may indicate the rotation information, and the coordinate of the axis corresponding to a radius may indicate the scale information.

In general, a fingerprint image may not have a substantial scale change, and thus a radius may be fixed as a preset value, for example, 1. In such a case, a location of a peak detected through the phase correlation may be expressed as the coordinate of the axis corresponding to an angle. The coordinate of the axis corresponding to an angle may indicate the rotation information.

In operation 1050, the block is rotated based on the rotation information. In operation 1060, the FFT is applied to the rotated block. In operation 1070, the phase correlation is performed. A location of a peak detected as a result of the phase correlation may indicate translation information, for example, (Tx, Ty), between the block and the enrolled partial image. In operation 1080, the rotated block is translated based on the translation information.

Referring back to FIG. 7, in operation 710, the fingerprint recognition apparatus calculates L block scores indicating a degree of matching of the block currently being processed to the L enrolled partial images based on a result of the matching. As described with reference to FIG. 8, the fingerprint recognition apparatus may rotate and translate the block currently being processed based on a pair of translation information and rotation information with respect to a first enrolled partial image to overlap the block currently being processed and the first enrolled partial image.

The fingerprint recognition apparatus may calculate a block score in an overlapping region. The fingerprint recognition apparatus may calculate a block score using various methods. For example, the fingerprint recognition apparatus may calculate a block score based on a normalized cross correlation method based on an image brightness value. For example, the fingerprint recognition apparatus may calculate a block score based on Equation 1 which defines, for example, a normalized cross correlation (ncc) function.

$$ncc(I_1, I_2) = \frac{\sum_{(i,j) \in W} I_1(i, j) \cdot I_2(x+i, y+j)}{\sqrt[2]{\sum_{(i,j) \in W} I_1^2(i, j) \cdot \sum_{(i,j) \in W} I_2^2(x+i, y+j)}}$$ [Equation 1]

In Equation 1, "W" denotes an overlapping region between an image $I_1$ and an image $I_2$. The image $I_1$ is a rotated block and the image $I_2$ is an enrolled partial image. The term "i" denotes an X-axis coordinate of a pixel in the overlapping region, and the term "j" denotes a Y-axis coordinate of the pixel in the overlapping region. The term "x" denotes translation information in an X-axis direction, for example, Tx, and the term "y" denotes translation information in a Y-axis direction, for example, Ty. The expression "$I_1(i, j)$" denotes a pixel value (e.g., a pixel brightness value) on (i, j) coordinates of the image $I_1$. The expression "$I_2(x+i, y+j)$" denotes a pixel value (e.g., a pixel brightness value) on (x+i, y+j) coordinates of the image $I_2$.

Figure 10:
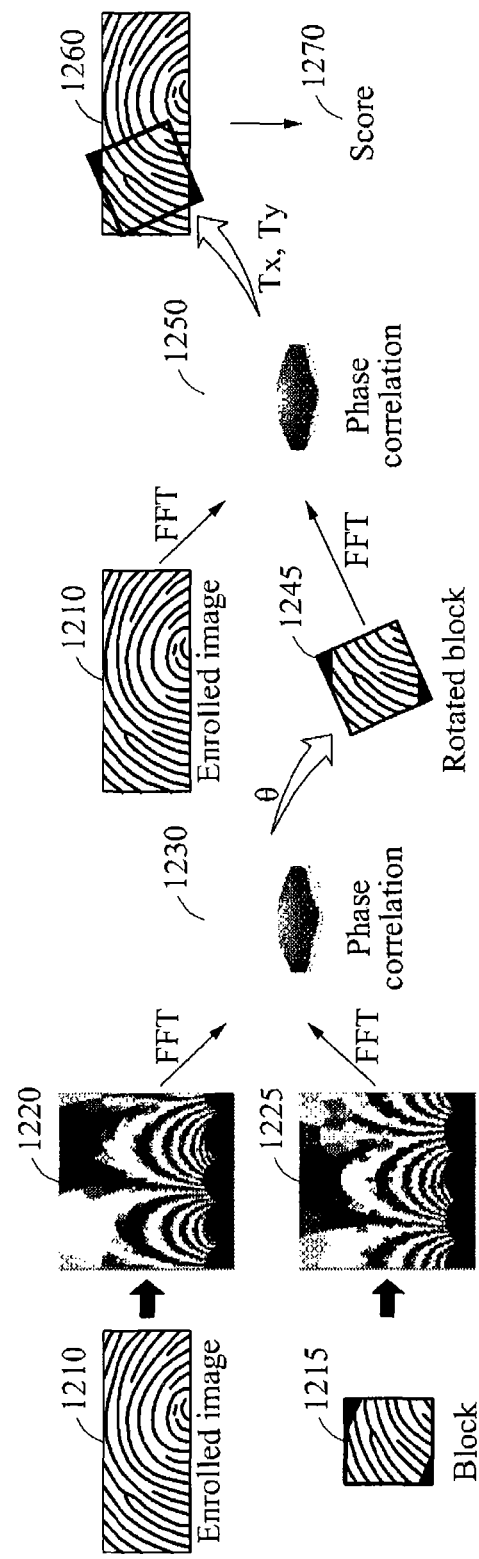
FIG. 10 illustrates an example of an operation of processing an enrolled image and an input image to calculate a block score according to at least one example embodiment.

FIG. 10 illustrates an example of an operation of processing an enrolled image and an input image to calculate a block score according to at least one example embodiment. Referring to FIG. 10, an enrolled image 1210 is transformed to a first image 1220 through an FFT and an LPT. A block 1215 of an input image is transformed to a second LPT image 1225 through an FFT and an LPT.

Rotation information, for example, θ, between the enrolled image 1210 and the block 1215 is determined through a phase correlation 1230 between the first LPT image 1220 and the second LPT image 1225. The block 1215 is rotated based on the determined rotation information. Translation information, for example, (Tx, Ty), between the enrolled image 1210 and the block 1215 is determined through a phase correlation 1250 between an FFT image of the enrolled image 1210 and an FFT image of the rotated block 1245.

According to at least some example embodiments, matching of the enrolled image 1210 and the block 1215 is performed based on the rotation information and the translation information. A score 1270 in an overlapping region between the enrolled image 1210 and the rotated block 1245 of the matching image 1260 is calculated. The score 1270 may be also referred to as a block score and a matching score.

Referring back to FIG. 7, the fingerprint recognition apparatus may calculate block scores with respect to second through L-th enrolled partial images. The block score may also be referred to as a matching score.

In operation 720, the fingerprint recognition apparatus performs a verification operation to determine whether or not a block most recently processed is a last block among the N blocks. For example, when the processed block is not the last block among the N blocks, the fingerprint recognition apparatus may perform operation 710 on a block yet to be processed. The fingerprint recognition apparatus may calculate N×L block scores by repetitively perform operations 720 and 730 N times.

In operation 730, the fingerprint recognition apparatus selects top K block scores from among the N×L block scores. As described with reference to FIG. 4, the input partial image 315 and the enrolled partial image 323 may partially overlap. In such a case, a block located in the overlapping region among the blocks of the input partial image 315 may obtain a significant block score, and a block located in a non-overlapping region may obtain an insignificant block score. Thus, the fingerprint recognition apparatus may exclude the insignificant block score by selecting the top K block scores from among the N×L block scores. Here, K may be determined within a range less than or equal to N×L.

The fingerprint recognition apparatus may calculate a feature value based on the top K block scores. For example, the fingerprint recognition apparatus may calculate a sum of the top K block scores using Equation 2.

$$\text{Val} = \sum_{i=1}^{K} \downarrow \text{Score}(B_i)$$ [Equation 2]

In Equation 2, the term "$\downarrow \text{Score}(B_i)$" denotes an i-th block score arranged in a descending order. A method of calculating a feature value (Val) may be variously modified, for example, obtaining an average of the top K block scores. In addition, different weights may be applied to respective block scores to calculate the feature value based on a calculated desired or, alternatively, optimal rotation angle at which a block has a highest block score.

In operation 740, the fingerprint recognition apparatus performs user authentication by comparing the feature value to a threshold value. For example, when the feature value is greater than the threshold value, the fingerprint recognition apparatus determines the authentication to be successful in operation 750. Conversely, when the feature value is less than or equal to the threshold value, the fingerprint recognition apparatus determines the authentication to be a failure in operation 760. The threshold value may be determined based on a method of calculating the feature value, the number of enrolled partial images, a quality of the enrolled partial images, and a quality of the input partial image.

Figure 11:
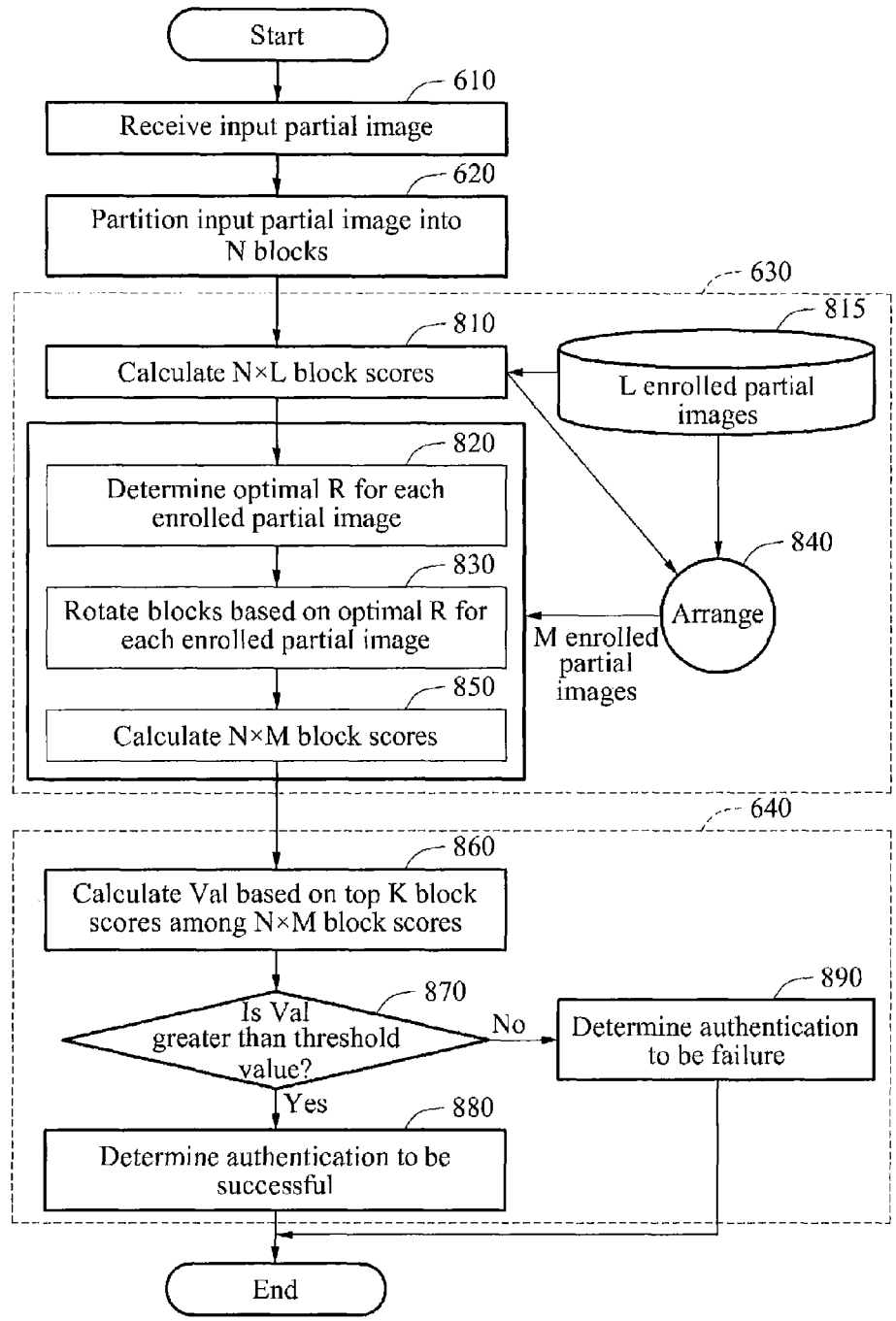
FIG. 11 is a flowchart illustrating another example of a user authentication method according to at least one example embodiment.

FIG. 11 is a flowchart illustrating another example of a user authentication method according to at least one example embodiment.

A fingerprint recognition apparatus (e.g., the fingerprint recognition apparatus 300) may calculate a rotation angle of each block with respect to enrolled partial images, and calculate desired or, alternatively, optimal rotation angles with respect to the enrolled partial images. The fingerprint recognition apparatus may identically apply a desired or, alternatively, optimal rotation angle corresponding to each enrolled partial image to all the blocks, and obtain a matching score by calculating a translation between a rotated block and an enrolled partial image.

An operation of the fingerprint recognition apparatus may be divided into two phases. In a first phase, the fingerprint recognition apparatus may match one enrolled partial image to N blocks of an input partial image (e.g., using the matching method illustrated in FIG. 8) and obtain N matching scores. The fingerprint recognition apparatus may identically apply, to all the blocks, a rotation angle of a block having a highest matching score among the N matching scores obtained as a result of the matching. The block having a highest matching score among the N matching scores may be, for example, a block having a highest degree of similarity with respect to the enrolled image among the N blocks. In a second phase, the fingerprint recognition apparatus may calculate a translation of each block.

Although described in detail hereinafter, the fingerprint recognition apparatus may select enrolled partial images corresponding to top M matching scores based on the matching scores in the first phase, and calculate a translation only using the selected enrolled partial images in the second phase to effectively increase a processing speed.

Referring to FIG. 11, in operation 810, the fingerprint recognition apparatus obtains L enrolled partial images from a database 815. In operation 810, the fingerprint recognition apparatus matches N blocks to the L enrolled partial images. For example, in operation 810, a matching operation may be performed for each enrolled partial image of the L enrolled partial images. For example, for a first enrolled partial image from among the L enrolled partial images, a fingerprint recognition apparatus may match the first enrolled partial image to N blocks of an input partial image (e.g., using the matching method illustrated in FIG. 8) and obtain N first block scores for the first enrolled image as a result of the matching. In operation 810, the same matching operation discussed above with respect to the first enrolled partial image may be performed for the remaining enrolled partial images from among the L enrolled partial images. As a result, the fingerprint recognition apparatus may calculate, for example, N×L block scores, based on a result of the matching. Descriptions of operations 710 and 720 provided with reference to FIG. 7 may be applicable to operation 810.

In operation 820, the fingerprint recognition apparatus determines a desired or, alternatively, optimal rotation angle (R) for each enrolled partial image. The desired or, alternatively, optimal rotation angle for each enrolled partial image may be an angle used to rotate the blocks in response to the enrolled partial images. Further, in operation 820, the fingerprint recognition apparatus may select a highest block score from among first N block scores determined for the first enrolled image during the matching operation that was performed for the first enrolled image during operation 810. The fingerprint recognition apparatus may extract a rotation angle from matching information in which the selected highest block score is calculated. For example, in operation 820, the fingerprint recognition apparatus may extract, for the first enrolled partial image, a rotation angle R. The rotation angle R extracted for the first enrolled partial image is the rotation angle of the block that was determined to have the highest block score during the matching that was performed for the first enrolled image during operation 810. The matching information may be a pair including the rotation angle R and a translation of the block that was determined to have the highest block score during the matching operation that was performed for the first enrolled image during operation 810. The fingerprint recognition apparatus may determine the extracted rotation angle R to be the desired or, alternatively, optimal rotation angle to use for rotating all N blocks with respect to the first enrolled partial image. In operation 820, the fingerprint recognition apparatus may use the same process described above with respect to the first enrolled partial image of the L enrolled partial images to determine a desired or, alternatively, optimal rotation angle R for each of the remaining enrolled partial images of the L enrolled partial images. Thus, in operation 820, the fingerprint recognition apparatus may determine L optimal rotation angles R for L enrolled images, respectively.

In operation 830, the fingerprint recognition apparatus rotates the N blocks based on the desired or, alternatively, optimal rotation angle R determined in operation 820 for each of the L enrolled partial images, respectively. For example, in operation 830, the fingerprint recognition apparatus may rotate the N blocks by the desired or, alternatively, optimal rotation angle R determined in operation 820 for the first enrolled partial image of the L enrolled partial images. Also, in operation 830, the fingerprint recognition apparatus may rotate the N blocks by the desired or, alternatively, optimal rotation angles R determined in operation 820 for the remaining enrolled partial images of the L enrolled partial images, respectively. In operation 850, the fingerprint recognition apparatus compares the blocks rotated in response to the enrolled partial images to the enrolled partial images. For example, the fingerprint recognition apparatus may re-match the blocks rotated in response to each of the enrolled partial images to a corresponding enrolled partial image using a frequency-based matching method. According to at least some example embodiments, the re-matching performed by the fingerprint recognition apparatus in operation 850 may include operations 1060-1080 of FIG. 8, and may exclude operations 1011-1050. Here, the fingerprint recognition apparatus may determine translations of the blocks while maintaining the rotation angles of the blocks. The fingerprint recognition apparatus may calculate second block scores based on a result of the re-matching in operation 850. According to at least some example embodiments, the re-matching performed by the fingerprint recognition apparatus in operation 850 may be performed for each of the L enrolled partial images.

According to at least some example embodiments, operations 820, 830 and 850 may be performed with respect to all L enrolled partial images in the manner discussed above. However, as will be discuss in greater detail below, according to at least some example embodiments, an additional ranking operation may be performed in operation 840, and operations 820, 830 and 850 may be performed for less than all L enrolled partial images. For example, the fingerprint recognition apparatus may not use all the L enrolled partial images to calculate the second block scores in operation 850. In operation 840, the fingerprint recognition apparatus arranges the L enrolled partial images based on the first block scores (e.g., the N block scores determined for each of the L enrolled partial images in operation 810). For example, the fingerprint recognition apparatus may arrange the enrolled partial images, starting from an enrolled partial image relating to a highest first block score. For example, the fingerprint recognition apparatus may rank the L enrolled partial images from highest to lowest based on first block scores determined in operation 810. For example, the fingerprint recognition apparatus may rank the L enrolled partial images from highest to lowest based on block score averages of the L enrolled partial images where, for each enrolled partial image from among the L enrolled images, the block score average of the enrolled partial image is an average of the N block scores determined for the enrolled partial image in operation 810. As another example, the fingerprint recognition apparatus may rank the L enrolled partial images from highest to lowest based on highest block scores of the L enrolled partial images where, for each enrolled partial image from among the L enrolled images, the highest block score of the enrolled partial image is the highest block score from among of the N block scores determined for the enrolled partial image in operation 810. The fingerprint recognition apparatus may select M enrolled partial images based on the arrangement order. For example, the fingerprint recognition apparatus may select the M highest ranked enrolled partial images from among the L enrolled partial images. Here, M is a positive integer less than L. By comparing only the M enrolled partial images selected from among the L enrolled partial images to an input partial image, a processing speed of the fingerprint recognition apparatus may be increased.

In such a case, in operation 820, the fingerprint recognition apparatus calculates desired or, alternatively, optimal rotation angles for the M enrolled partial images (i.e., not for all L enrolled partial images). In operation 830, the fingerprint recognition apparatus rotates the blocks based on a desired or, alternatively, optimal rotation angle for each of the M enrolled partial images not for all L enrolled partial images). In operation 850, the fingerprint recognition apparatus calculates second block scores, for example, N×M block scores (i.e., not for all L enrolled partial images).

In operation 860, the fingerprint recognition apparatus selects top K block scores from among the N×M block scores (or, alternatively, the N×L block scores). The fingerprint recognition apparatus calculates a feature value (Val) based on the top K block scores. In operation 870, the fingerprint recognition apparatus determines user authentication by comparing the feature value to a threshold value. For example, when the feature value is greater than the threshold value, the fingerprint recognition apparatus determines the authentication to be successful in operation 880. Conversely, when the feature value is less than or equal to the threshold value, the fingerprint recognition apparatus determines the authentication to be a failure in operation 890.

Although the comparison using a plurality of enrolled images is described in the foregoing, the same authentication method may be applicable to a case in which a single enrolled image is present, L=1. In such a case, the value of K may be determined in a range of greater than or equal to 1 and less than or equal to N. In addition, although an input image and an enrolled image are described as a partial fingerprint image, the same authentication method may be applicable to a case in which the input and the enrolled images are an entire fingerprint image.

Figure 12:
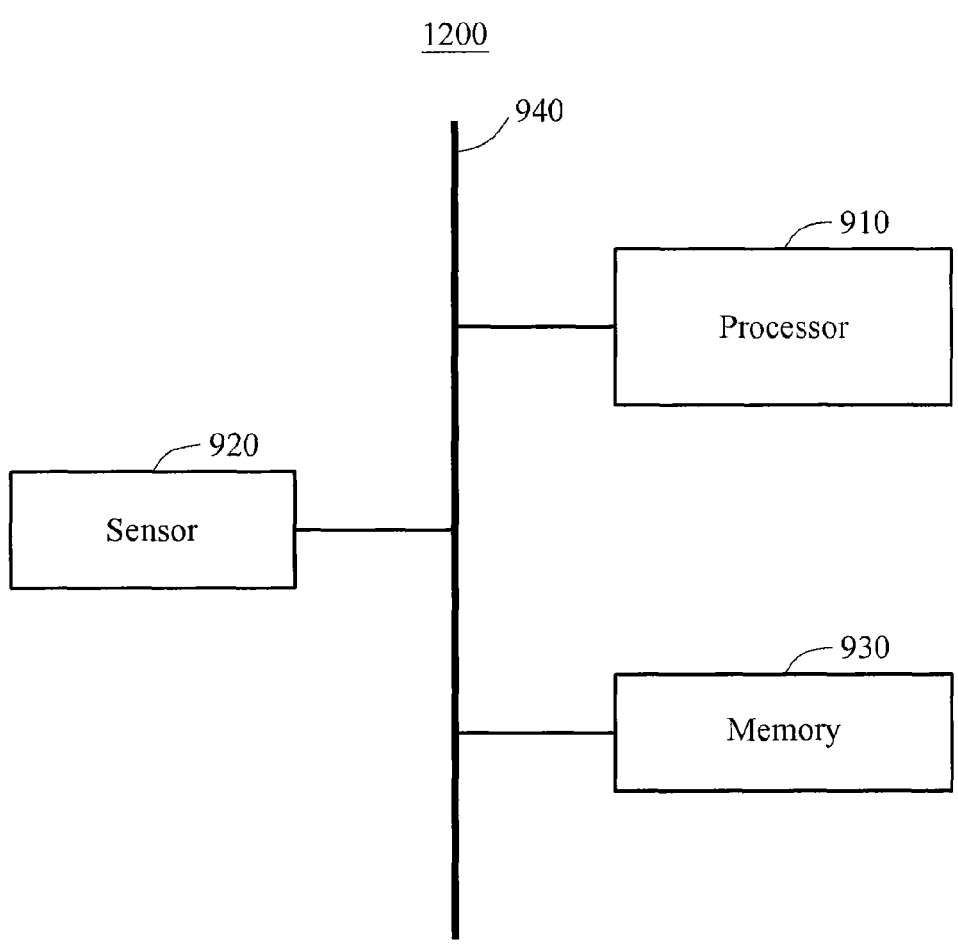
FIG. 12 is a diagram illustrating an example of an electronic system according to at least one example embodiment.

FIG. 12 is a diagram illustrating an example of an electronic system 1200 according to at least one example embodiment. Referring to FIG. 12, the electronic system 1200 includes a sensor 920, a processor 910, and a memory 930. The sensor 920, the processor 910, and the memory 930 may communicate with one another through a bus 940. The processor 910 may be, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers. According to at least some example embodiments, the electronic system 1200 is an example of the fingerprint recognition apparatus 300 discussed in FIG. 3. For example, any functions described herein as being performed by the fingerprint recognition apparatus 300 or a fingerprint recognition apparatus may be performed by the fingerprint recognition apparatus 300 including the structure of the electronic system 1200. For example, the memory 930 may store program code including instructions configured to cause the processor 910, when executing the program code, to perform any or all functions described in the present disclosure as being performed by the fingerprint recognition apparatus 300, a fingerprint recognition apparatus, and/or the electronic system 1200.

The sensor 920 may be the fingerprint sensor 310 illustrated in FIG. 3. The sensor 920 may capture a fingerprint image using a well-known method, for example, a method of converting a desired or, alternatively, optimal image to an electrical signal. The captured fingerprint image may be output to the processor 910.

The processor 910 may include at least one device or unit described with reference to FIGS. 1 through 11, or perform at least one method described with reference to FIGS. 1 through 11. For example, the processor 910 may include the fingerprint recognition apparatus 300 of FIG. 3. The memory 930 store partial images captured by the sensor 920 and then enrolled, an input partial image captured by the sensor 920, a result of matching processed by the processor 910, and/or block scores calculated by the processor 910. The memory 930 may be a volatile memory or a nonvolatile memory.

The processor 910 may execute a program and control the electronic system 1200. A program code executed by the processor 910 may be stored in the memory 930. The electronic system 1200 may be connected to an external device, for example, a PC and a network, through an input and output device (not show and may exchange data with the external device.

The electronic system 1200 may be provided in various forms, for example, a mobile device such as a mobile phone, a smartphone, a personal digital assistant (PDA), a tablet computer, and a laptop computer, a computing device such as a PC, a tablet computer, and a netbook, and a television (TV), a smart TV, and a security device for gate control.

Although examples described herein relate to recognizing a user using a portion of a fingerprint of the user, such examples may be further applied to recognizing the user using a portion of biodata of the user. The biodata may include information about the fingerprint, blood vessels, and an iris of the user. In such an application, the processor 910 may receive input partial data corresponding to the portion of the biodata of the user, partition the input partial data into blocks, compare the blocks to enrolled partial data sets corresponding to partial data sets of enrolled biodata, and recognize the user based on a result of the comparing.

In an example, the sensor 920 may include a sensor configured to recognize a blood vessel pattern of the user. The sensor 920 may extract the blood vessel pattern from a dorsal hand skin of the user. The sensor 920 may increase or, alternatively, maximize a brightness of blood vessels against a brightness of the skin using an infrared lighting and filter, and obtain an image including the blood vessel pattern. In such an example, the processor 910 may recognize the user by comparing a partial image corresponding to a portion of the blood vessel pattern to a partial image corresponding to an enrolled blood vessel pattern.

In another example, the sensor 920 may include a sensor configured to recognize an iris pattern of the user. The sensor 920 may scan or capture the iris pattern between a pupil and a sclera, which is a white area of an eye, of the user. The sensor 920 may obtain a partial image corresponding to a portion of the iris pattern. In such an example, the processor 910 may recognize the user by comparing the partial image corresponding to the portion of the iris pattern to a partial image corresponding to an enrolled iris pattern.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be, for example, those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:
1. A fingerprint recognition method, comprising:
receiving an input partial image corresponding to a partial image of a fingerprint of a user;
partitioning the input partial image into a plurality of blocks;
performing a comparison operation based on the plurality of blocks and enrolled partial images corresponding to partial images of an enrolled fingerprint; and
recognizing the fingerprint of the user based on a result of the comparison operation,
wherein the performing the comparison operation comprises:
calculating scores by matching each block of the plurality of blocks to the enrolled partial images, and
selecting first scores from among the calculated scores, a total number of the first scores being less than a total number of the calculated scores, and
wherein the recognizing comprises:
recognizing the fingerprint of the user based on the selected first scores.
2. The method of claim 1, wherein the receiving comprises:
sensing a partial region of the fingerprint of the user through a sensing region smaller than a size of the fingerprint of the user.

3. The method of claim 1, further comprising:
generating the enrolled partial images by iteratively sensing partial regions of a fingerprint of an enrolled user through a sensing region smaller than a size of the fingerprint of the enrolled user.

4. The method of claim 1, wherein the partitioning comprises:
partitioning the input partial image into the plurality of blocks based on a first pattern.

5. The method of claim 1, wherein the performing the comparison operation comprises:
comparing a first block among the plurality of blocks to the enrolled partial images; and
comparing a second block among the plurality of blocks to the enrolled partial images.

6. The method of claim 1, wherein the performing the comparison operation comprises:
calculating scores indicating a degree of matching between each block of the plurality of blocks and the enrolled partial images.

7. The method of claim 1, wherein the performing the comparison operation comprises:
matching the plurality of blocks to the enrolled partial images; and
comparing the plurality of blocks to the enrolled partial images based on a result of the matching.

8. The method of claim 7, wherein the matching comprises:
determining at least one of translation information, rotation information, or scale information between the plurality of blocks and the enrolled partial images based on a frequency-based matching method.

9. The method of claim 1, wherein the performing the comparison operation comprises:
determining first rotation angles with respect to the enrolled partial images by matching each block of the plurality of blocks to the enrolled partial images;
rotating the plurality of blocks based on the first rotation angles with respect to the enrolled partial images; and
comparing the plurality of blocks rotated based on the first rotation angles to the enrolled partial images.

10. The method of claim 9, wherein the determining comprises:
determining second rotation angles between the plurality of blocks and the enrolled partial images based on a frequency-based matching method; and
determining the first rotation angles with respect to the enrolled partial images using scores based on the second rotation angles.

11. The method of claim 1, wherein the performing the comparison operation comprises:
calculating scores by matching each block of the plurality of blocks to the enrolled partial images;
selecting a first images from among the enrolled partial images based on the calculated scores, a total number of the first images being less than a total number of the enrolled partial images;
determining first rotation angles with respect to the first images based on the calculated scores;
rotating the plurality of blocks based on the first rotation angles with respect to the first images; and
comparing the plurality of blocks rotated based on the first rotation angles to the first images.

12. The method of claim 1, wherein the recognizing comprises at least one of:
authenticating the user based on the result of the comparison operation; and
identifying the user based on the result of the comparison operation.

13. The method of claim 1, wherein the recognizing comprises:
selecting a first number of pairs of the plurality of blocks and the enrolled partial images based on the result of the comparison operation; and
recognizing the fingerprint of the user based on the selected pairs.

14. The method of claim 13, wherein the selecting comprises:
selecting the first number of pairs based on a score between a block and an enrolled partial image included in each of the selected pairs.

15. A computer-readable medium storing a computer program that includes instructions which, when executed by one or more processors, cause the one or more processors to perform the method of claim 1.

16. A fingerprint recognition apparatus, comprising:
a fingerprint sensor configured to receive an input image corresponding to a fingerprint of a user; and
at least one processor configured to partition the input image into a plurality of blocks, perform a comparison operation based on the plurality of blocks and at least one enrolled image corresponding to an enrolled fingerprint, and recognize the fingerprint of the user based on a result of the comparison operation,
wherein the at least one processor is configured to,
calculate scores by matching each block of the plurality of blocks to the at least one enrolled image, select first scores from among the calculated scores, a total number of the first scores being less than a total number of the calculated scores, and
recognize the fingerprint of the user based on the selected first scores.

17. The apparatus of claim 16, wherein the input image corresponds to a partial image of the fingerprint of the user, and the at least one enrolled image corresponds to at least one partial image of the enrolled fingerprint.

18. The apparatus of claim 16, wherein the at least one processor is configured to match the plurality of blocks to the at least one enrolled image, and calculate scores indicating a degree of matching between each block of the plurality of blocks and the at least one enrolled image.

19. The apparatus of claim 18, wherein the at least one processor is configured to determine at least one of translation information, rotation information, or scale information between the plurality of blocks and the at least one enrolled image based on a frequency-based matching method.

20. The apparatus of claim 16, wherein the at least one processor is configured to,
determine a first rotation angle of the at least one enrolled image by matching the plurality of blocks to the at least one enrolled image,
rotate the plurality of blocks based on the determined first rotation angle, and
compare, to the at least one enrolled image, the plurality of blocks rotated based on the determined first rotation angle.

21. The apparatus of claim 20, wherein the at least one processor is configured to determine rotation angles between the plurality of blocks and the at least one enrolled image based on a frequency-based matching method.

22. The apparatus of claim 16,
wherein the at least one processor is configured to,
    calculate scores by matching the plurality of blocks to the at least one enrolled image,
    select a first number of enrolled images from among the at least one enrolled image based on the calculated scores,
    determine first rotation angles with respect to the selected enrolled images based on the calculated scores,
    rotate the plurality of blocks based on the first rotation angles with respect to the selected enrolled images, and
    compare, to the selected enrolled images, the plurality of blocks rotated based on the first rotation angles,
wherein the at least one enrolled image is a plurality of enrolled images, and
wherein the first number is less than a total number of the plurality of enrolled images.

23. The apparatus of claim 16, wherein the at least one processor is configured to authenticate the user based on the result of the comparison operation or identify the user based on the result of the comparison operation.

24. The apparatus of claim 16, wherein the at least one processor is configured to,
    select a first number of pairs of the plurality of blocks and the at least one enrolled image based on the result of the comparison operation, and
    recognize the fingerprint of the user based on the selected pairs.

25. The apparatus of claim 24, wherein the at least one processor is configured to select the first number of pairs based on a score between a block and an enrolled image included in each of the pairs.

26. A bioimage recognition method, comprising:
receiving an input image corresponding to biodata of a user;
partitioning the input image into a plurality of blocks;
performing a comparison operation based on the plurality of blocks and an enrolled image corresponding to enrolled biodata; and
recognizing the user based on a result of the comparison operation,
the comparison operation including,
    generating first frequency-domain information based on the enrolled image,
    generating second frequency-domain information based on the plurality of blocks, and
    performing phase correlation operations based on the first frequency-domain information and the second frequency-domain information.

27. The method of claim 26, wherein the bioimage includes at least one of a fingerprint image, a blood vessel image, or an iris image.

28. A fingerprint recognition method, comprising:
receiving an input fingerprint image captured by an image sensor;
generating a plurality of blocks, the plurality of blocks being image blocks of the input fingerprint image;
for each enrolled fingerprint image from among one or more enrolled fingerprint images,
    selecting a first rotation angle by performing a first matching operation based on the enrolled fingerprint image and the plurality of blocks,
    rotating each of the plurality of blocks by the first rotation angle, and
    performing a second matching operation based on the enrolled fingerprint image and the plurality of blocks rotated by the first rotation angle; and
determining whether or not to authenticate the input fingerprint image based on the second matching operations performed for each of the one or more enrolled fingerprint images,
wherein the first matching operation includes generating first frequency-domain information for a first enrolled image from among the one or more enrolled fingerprint images.

29. The fingerprint recognition method of claim 28, wherein, for the first enrolled image, the selecting comprises:
    performing the first matching operation based on the plurality of blocks and the first enrolled image to determine a plurality of rotation angles corresponding to the plurality of blocks, respectively;
    rotating the plurality of blocks by the determined plurality of rotation angles corresponding to the plurality of blocks, respectively;
    generating a plurality of first block scores corresponding to the plurality of blocks, respectively, based on the first enrolled image and the plurality of blocks rotated by the determined plurality of rotation angles; and
    selecting the first rotation angle from among the determined plurality of rotation angles, based on the plurality of first block scores,
    the plurality of first block scores indicating degrees to which the plurality of blocks corresponding to the plurality first block scores match the first enrolled image, when the plurality of blocks are rotated by the determined plurality of rotation angles.

30. The fingerprint recognition method of claim 29, wherein the first matching operation comprises:
    for each block from among the plurality of blocks,
        generating second frequency-domain information based on the block;
        performing a phase correlation operation based on the first frequency-domain information and the second frequency-domain information; and
        determining the determined rotation angle, from among the plurality of determined rotation angles, that corresponds to the block, based on the phase correlation operation.

31. The fingerprint recognition method of claim 29, wherein the determining whether or not to authenticate the input fingerprint image comprises:
    for each enrolled fingerprint image from among the one or more enrolled fingerprint images,
        generating a plurality of second block scores corresponding to the plurality of blocks, respectively, based on the enrolled fingerprint image and the plurality of blocks rotated by the first rotation angle selected for the enrolled fingerprint image,
        the plurality of second block scores indicating degrees to which the plurality of blocks corresponding to the plurality of second block scores match the enrolled fingerprint image, when the plurality of blocks are rotated by the first rotation angle; and
    determining whether or not to authenticate the input fingerprint image based on the pluralities of second block scores generated for the one or more enrolled fingerprint images.

32. The fingerprint recognition method of claim 31,
wherein the input fingerprint image is a partial image of a fingerprint captured by an image sensor, and wherein each of the one or more enrolled fingerprint images is a partial image of a fingerprint and is stored in a memory.

33. The fingerprint recognition method of claim 32, wherein the generating a plurality of blocks comprises:
generating the plurality of blocks by partitioning the input fingerprint image into the plurality of blocks.

34. The fingerprint recognition method of claim 28, wherein the determining whether or not to authenticate the input fingerprint image comprises:
for each enrolled fingerprint image from among the one or more enrolled fingerprint images,
generating a plurality of first block scores corresponding to the plurality of blocks, respectively, based on the enrolled fingerprint image and the plurality of blocks rotated by the first rotation angle selected for the enrolled fingerprint image,
the plurality of first block scores indicating degrees to which the plurality of blocks corresponding to the plurality of first block scores match the enrolled fingerprint image, when the plurality of blocks are rotated by the first rotation angle; and
determining whether or not to authenticate the input fingerprint image based on the pluralities of first block scores generated for the one or more enrolled fingerprint images.

35. The fingerprint recognition method of claim 34, wherein the input fingerprint image is a partial image of a fingerprint captured by an image sensor, and
wherein each of the one or more enrolled fingerprint images is a partial image of a fingerprint and is stored in a memory.

36. The fingerprint recognition method of claim 35, wherein the generating a plurality of blocks comprises:
generating the plurality of blocks by partitioning the input fingerprint image into the plurality of blocks.

\* \* \* \* \*